United States Patent [19]
Fauret et al.

[11] Patent Number: 5,565,099
[45] Date of Patent: Oct. 15, 1996

[54] FLOATATION CELL WITH INTEGRATED WALL SCRAPING MEANS

[75] Inventors: Patrick Fauret, Outremont; Reneau Dufour, Breakysville; Jocelyn Nadreau, Anjou, all of Canada

[73] Assignee: Les Traitements Des Eaux Poseidon Inc., Outremont, Canada

[21] Appl. No.: 563,090

[22] Filed: Nov. 27, 1995

[51] Int. Cl.⁶ .................................................. C02F 1/24
[52] U.S. Cl. ...................... 210/221.2; 210/91; 210/525; 210/527
[58] Field of Search ............................ 210/221.2, 221.1, 210/703, 776, 527, 519, 523, 525, 538, 540, 91; 209/170

[56] References Cited

U.S. PATENT DOCUMENTS

| | | |
|---|---|---|
| 2,330,589 | 9/1943 | Juell . |
| 2,793,185 | 5/1957 | Albrektsson . |
| 2,983,677 | 5/1961 | Boyd . |
| 3,286,844 | 11/1966 | Juell . |
| 3,794,171 | 2/1974 | Kimura . |
| 4,470,903 | 9/1984 | van Leeuwen . |
| 4,957,633 | 9/1990 | Suutarinen . |
| 5,130,029 | 7/1992 | Suutarinen . |
| 5,176,835 | 1/1993 | Perletti . |

FOREIGN PATENT DOCUMENTS

| | | |
|---|---|---|
| 659690 | 6/1995 | European Pat. Off. . |
| 841591 | 4/1984 | Finland . |
| 930951 | 7/1963 | United Kingdom . |
| 1210755 | 10/1970 | United Kingdom . |

Primary Examiner—Thomas M. Lithgow
Attorney, Agent, or Firm—Robic

[57] ABSTRACT

A floatation cell for treating wastewater in order to remove solid in suspension in the form of a floating sludge. This cell has a container which is rectangular in shape. A feed compartment in which the wastewater is fed, is located at one end of the compartment. A chute through which the floating sludge is collected and evacuated, is located at the other end of the container. The feed compartment has an outlet defined by a baffle that extends at a such height with respect to the top surface of the wastewater, as to generate a draining flow which directs the floating sludge towards the chute. The container also comprises scrappers mounted on its internal walls so as to be movable in an alternative, back and forth movement in order to avoid that the sludge accumulates on the walls and holds up the flow towards the chute. This system of evacuating the sludge is much simpler than the existing systems and the maintenance of the floatation cell is much easier to carry out.

11 Claims, 5 Drawing Sheets

FLOATATION CELL WITH INTEGRATED WALL SCRAPING MEANS

FIELD OF THE INVENTION

The present invention relates to an improvement to the floatation cells or similar equipments that are used for the treatment of liquids containing solids in suspension in order to remove these solids.

In the following description, reference will be made exclusively to the treatment of wastewater in order to remove the solids that may be in suspension within this wastewater in the form of a floating sludge. However, it should be understood that if the treatment of wastewater with the apparatuses known under the name of "clarifiers" is probably the most interesting one, the invention is not restricted to the treatment of wastewater exclusively. As a matter of fact, it could be used for the treatment of any other kind of liquid containing solids in suspension.

BRIEF DESCRIPTION OF THE PRIOR ART

Floatation is well known process that is commonly used on an industrial scale to separate solids in suspension in a liquid. It uses the difference of density that may exist between these two elements. In the case where the solids to be separated have a density lower than the one of the liquid, the separation by floatation occurs naturally. However, in the case where the density of the solids is equal to or slightly higher than the one of the liquid, the floatation can be "forced" by injecting air bubbles or micro-bubbles whose diameter varies from a few microns to a few millimeters.

In practice, the liquid to be treated is introduced at one end of a container in a feed compartment separated from the body of the container by a baffle. The solids separated by floatation within the body of the container form a layer of sludge that floats onto the surface of the liquid. This layer is pushed towards the other end of the container by a device known as a "thickener". This device consists of a plurality of rods transverse to the container, which support fingers engaging the sludge. These rods have ends mounted onto endless chains that are mounted onto toothed wheels fixed to the ends of a set of driving shafts transverse to the container, thereby forming a surface conveyor.

A chute is located on the other end of the container. This chute is used to collect and evacuate the sludge. A device known as a "pusher" is mounted onto the container to push into the chute the sludge drained to the same by the thickener. This pusher consists of at least one blade mounted onto a rotary shaft extending transversally onto the container, on top of the same, close to the chute.

In some equipments presently available in the market, the thickener and pusher can be combined to form only one single pushing device on top of the container, which consists of a plurality of blades mounted onto a pair of endless chains and driven by a set of tooth wheels and a motor.

Eventhough there are different possible embodiments, the basic principle of all the draining systems presently available is substantially the same in most of the industrial equipments. These systems essentially comprises means to sweep a substantial part of the upper surface of the container in order to push the floating sludge toward the chute through which it is evacuated.

From a practical standpoint, all the existing systems are relatively simple. However, the thickener which forms or not an integral part of them, comprises numerous rotating parts and thus calls for a substantial maintenance.

SUMMARY OF THE INVENTION

Following an extensive study of the operation of the existing floatation cells and after several tests carried out on such cells, it has been found that, in the particular cases where the of floatation cells are of a rectangular shape and comprises a feed compartment at one end and a chute at the other hand, it is possible to drain the sludge towards the chute and thus to evacuate the same without necessarily requiring a thickener or a pusher of the conveying type, extending over most of the upper surface for the container, provided however that the baffle of the feed compartment is positioned at such a height with respect to the upper surface of the wastewater as to generate a draining current towards the chute.

As a matter of fact, it has been discovered that, in such a case, a mere pusher of the type disclosed hereinabove, mounted close to the chute, and a set of small lateral scrapers sweeping a small part only of the surfaces of the container, viz. the internal walls of the same in its upper part, or, alternatively a set of two endless screws extending adjacent to the lateral surfaces of the container are actually sufficient to avoid the formation of dead zones along the walls of the container, where the sludge may accumulate and eventually hold up or otherwise impede the requested draining of the sludge towards the chute.

In other words, it has been discovered that, by taking full advantage of the "natural" draining of the sludge floating on top of the wastewater in the container, and by incorporating a scraping system of a very simple structure, it is possible to operate a floatation cell without requiring a thickener devised as a conveyor whose drawbacks have been mentioned hereinabove.

Therefore, the object of the invention as claimed hereinafter is essentially an improvement to a floatation cell like those used for the treatment of wastewater in order to eliminate the solids in suspension within the wastewater in the form of a sludge floating onto the surface of this wastewater, such a cell being of the type comprising:

a container in which the wastewater is treated, this container being generally rectangular in shape and having two opposite ends and two inner walls that extend parallel between the opposite ends;

a feed compartment in which the wastewater is fed, this compartment being located at one of the opposite ends of the container;

a chute located at the other opposite end of the container for collecting and evacuating the floating sludge formed within said container; and pushing means comprising at least one blade mounted onto a rotary shaft extending transversally on top of the container close to the chute in order to push the sludge into the chute.

In accordance with the invention, this floatation cell of a type known per se is improved in that:

the feed compartment has an outlet defined by a baffle that extends at such a height with respect to the top surface of the wastewater contained within the container that it generates a draining flow which directs the floating sludge towards the chute; and scraping means are provided for scraping at regular interval the inner walls of the container to avoid that the sludge accumulates on the walls and holds up the flow towards the chute.

In a first preferred embodiment of the invention, these scraping means include, for each inner wall, at least one scraper comprising a blade located within the container close to the inner wall, and to the top surface of the wastewater contained in the container, and actuation means for moving each scraper in an alternative back and forth movement along the corresponding inner wall.

The actuation means may include pneumatic cylinders for driving the scrapers. The number of scrapers and their size and shape may vary. As a matter of fact, it is only required that such number, size and shape be selected so that the necessary length of the internal walls of the container be swept. A set of stroke-end sensors and a device for actuating and controlling the cylinder including pneumatic valves as is known per se can be used for inverting the stroke of each cylinder in such a manner as to provide continuous back and forth movement of the scrapers from one end to the other end of each wall. The moving speed of the scrapers can also be adjusted if need be, by properly adjusting the air admission to the cylinders.

In another embodiment of the invention, the scraping means may also include, for each inner wall, an endless screw extending within the container along the inner wall thereof close to said inner wall and to the top surface of the wastewater contained within said container; and actuation means for driving into rotation said endless screw. A floatation cell for treating wastewater in order to remove solids in suspension within said wastewater in the form of a floating sludge, said cell comprising: a container in which the wastewater is treated, said container being generally rectangular in shape and having two opposite ends and two inner walls that extend parallel between said opposite ends; a feed compartment in which the wastewater is fed, said compartment being located at one of said opposite ends of the container; a chute located at said other opposite end of the container for collecting and evacuating the floating sludge formed within said container; and pushing means comprising at least one blade mounted onto a rotary shaft extending transversally on top of the container close to the chute in order to push the sludge into said chute, wherein: the feed compartment has an outlet defined by a baffle that extends at such a height with respect to the top surface of the wastewater contained within the container, as to generate a draining flow which directs the floating sludge towards the chute; and scraping means are provided for scraping at regular interval the inner walls of the container to avoid that the sludge accumulates on said walls and holds up the flow towards the chute. As can be understood, the improvement according to the invention is not only very efficient in use, but also very simple in structure. This improvement substantially reduces the maintenance problems presently encountered.

BRIEF DESCRIPTION OF THE DRAWINGS

The invention and its numerous advantages will be better understood upon reading the following, non-restrictive description of a preferred embodiment thereof, made with reference to the accompanying drawings in which.

DESCRIPTION OF PREFERRED
EMBODIMENTS OF THE INVENTION

Figure 1:
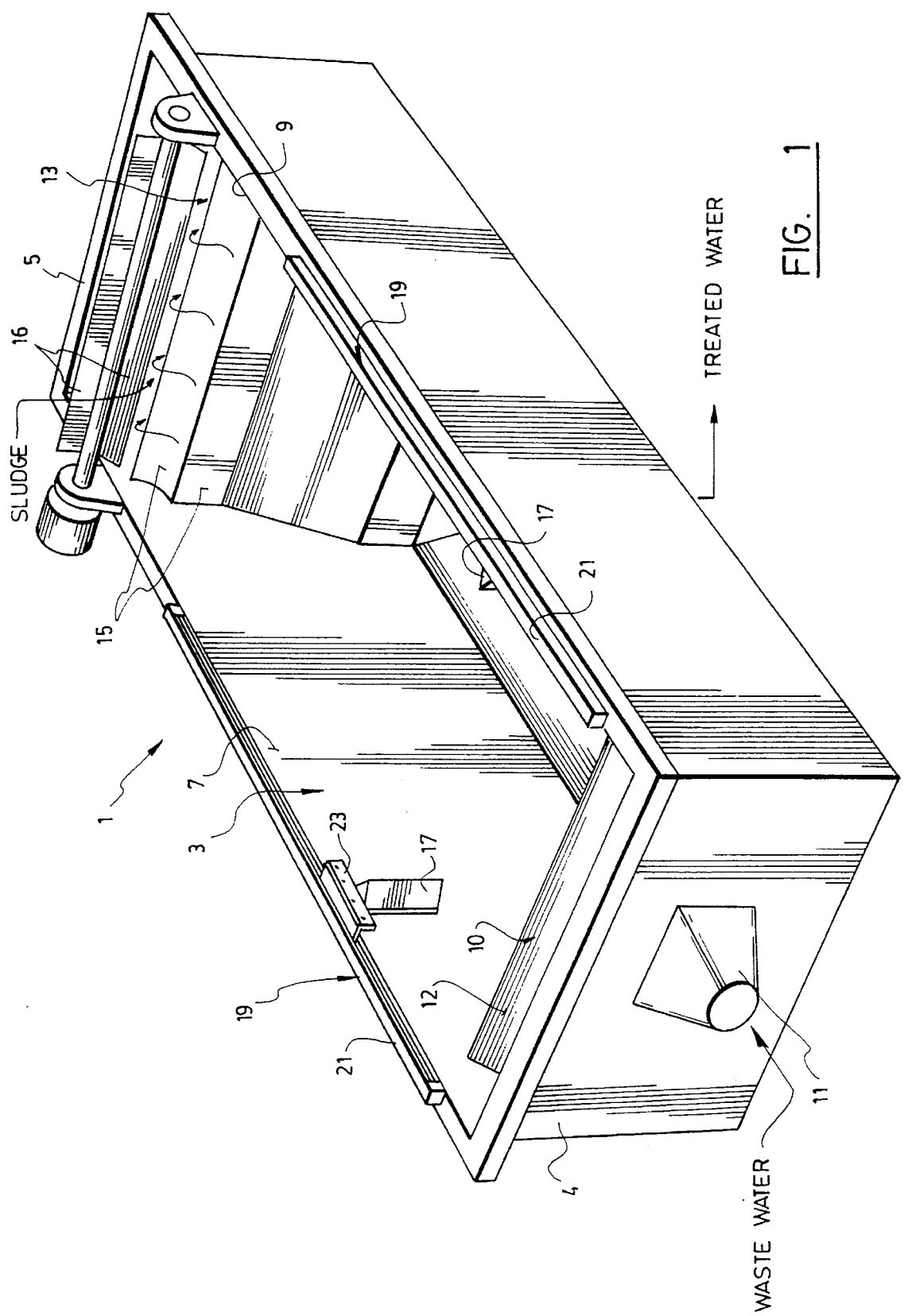
FIG. 1 is a perspective view of an improved floatation cell according to a first preferred embodiment of the invention.

The floatation cell 1 for the treatment of wastewater according to the invention as shown in FIG. 1, as is known per sea container 3 in which the wastewater is treated with or without injection of bubbles or micro bubbles of air in order to obtain the requested floatation. This container is of generally rectangular shape. It comprises two opposite ends 4 and 5 and two inner walls 7 and 9 that extend parallel between the opposite ends 4 and 5.

The container 3 is provided with a feed compartment 10 in which the wastewater is fed through a feeding conduct 11. As is shown, the feed compartment is located at the end 4 of the container, or close to the same. This feed compartment is separated from the body of the container by a baffle 12.

The container 3 is also provided with a chute 13 located at the other end 5 of it, in which the sludge formed during the treatment is collected and evacuated. From a practical standpoint, this chute is separated from the remaining of the container by a deflecting wall 15.

Furthermore, the cell comprises a pusher of a conventional type, including a set of blades 16 mounted onto a rotary shaft extending transverse to the container close to the chute 13, in order to push the sludge into the same. Evacuation of the treated water is achieved via a collecting pipe mounted in the bottom of the container 3.

According to a first original feature of the invention, the height at which extends the baffle 12 separating the feed compartment 10 from the remaining of the container is selected so as to be as close as possible to the upper surface of the wastewater contained in the container 3, in order to increase the speed at which the wastewater enters the container and, thereby, to generate a draining flow pushing the floating sludge towards the chute 13. In this connection, it is worth mentioning that the baffle 12 can be devised in such a manner as to be adjustable in height in order to adjust whenever required the speed at which the wastewater enters the container.

According to another original feature of the invention, means are also provided for scrapping at regular interval the inner walls 7 and 9 of the container in order to avoid that the sludge accumulates onto these walls and holds up the flow towards the chute 13.

Figure 2:
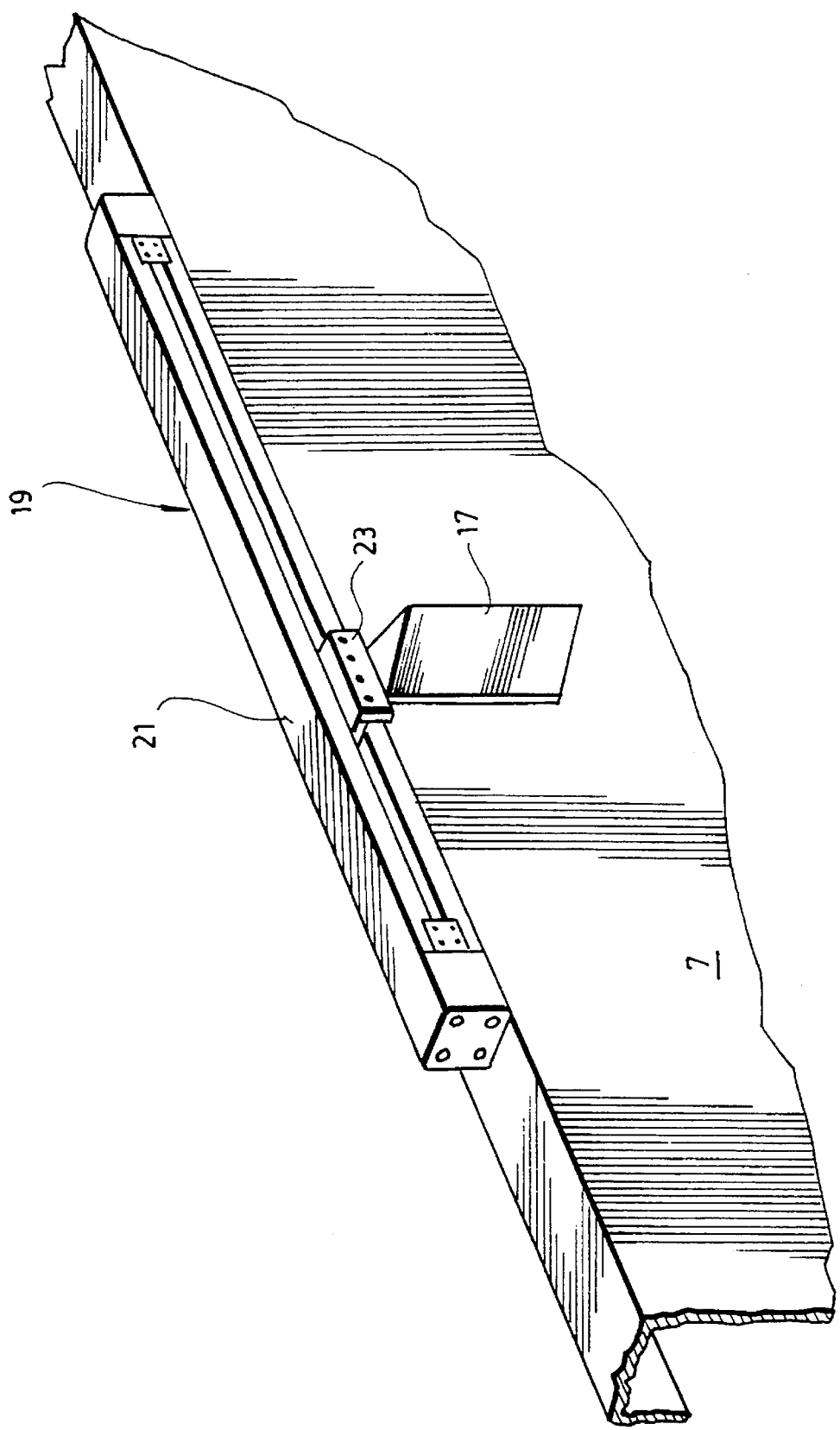
FIG. 2 is an enlarged perspective view of the scraping means used onto one of the inner walls of the container shown in FIG. 1.
Figure 4:
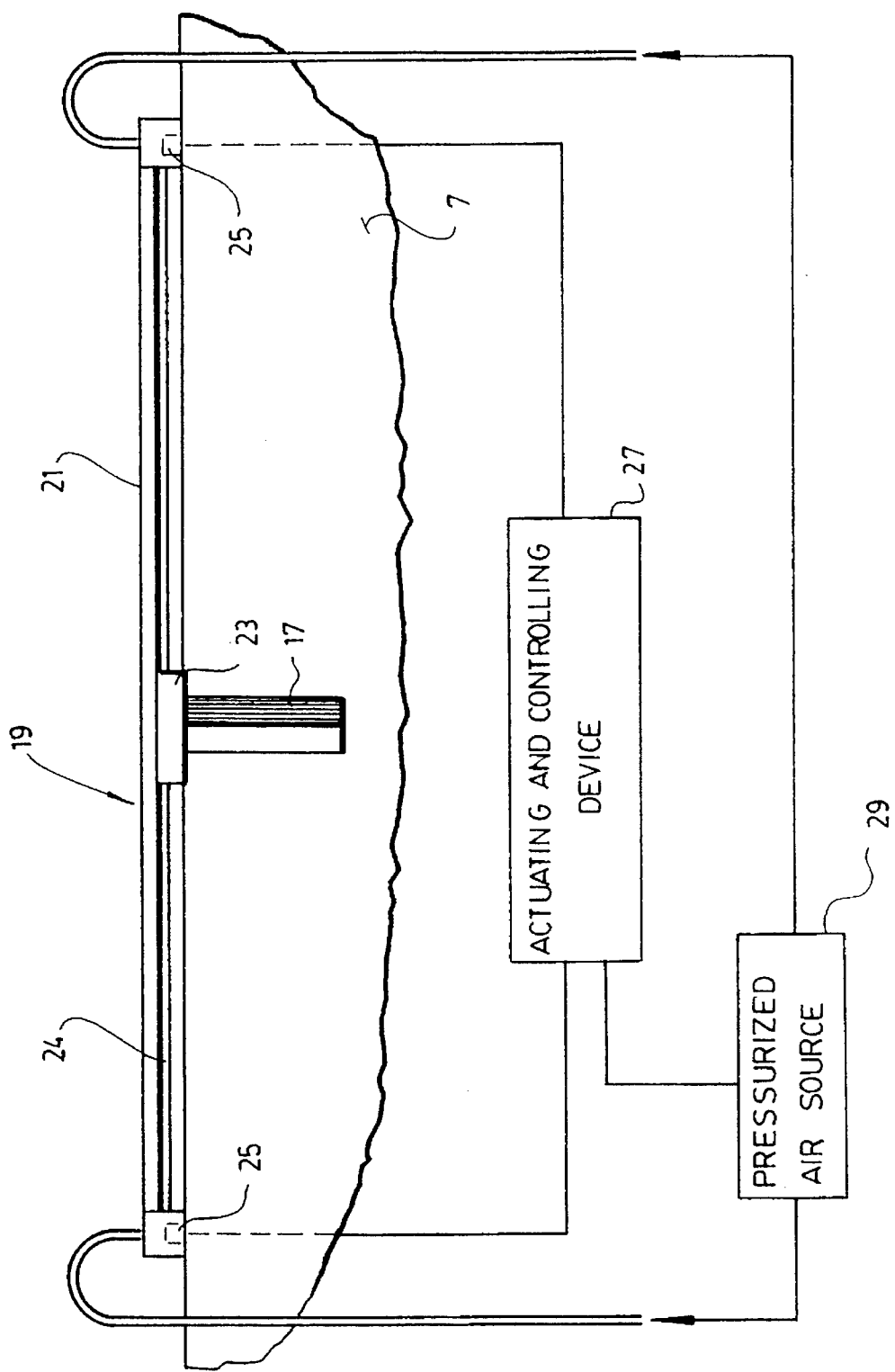
FIG. 4 is a diagrammatic front elevational view of the scraping means and the device for actuating and controlling the same, as used in the embodiment shown in FIGS. 1 to 3.

As is shown in FIGS. 1, 2 and 4, the scraping means may comprise, for each inner wall, a scraper 17 comprising a V-shaped blade mounted within the container close to the corresponding inner wall to be scraped, and at such a height as to be close to the top surface of the wastewater contained in the container. In such case, the scraping means must also comprise actuation means 19 for moving the scraper 17 in an alternative, back and forth movement along the corresponding inner wall, in order to scrape the sludge that may have been attached to the same.

As can be understood, the scraper, to be efficient, must be located in the upper part of the container, where the sludge accumulates.

The actuation means preferably includes a guiding rail 21 extending along at least one part of the corresponding inner wall, and on which the scraper 17 is mounted via a support 23 in order to be capable of sliding.

The actuating means also includes a pneumatic cylinder, preferably of the rod-less type, like the one sold by FESTO. This cylinder numbered 24 in FIG. 4 of the drawings, is mounted within the rail 23. It can be understood that, instead of a pneumatic cylinder, other means could be used to move the scraper 17 along the rail 21 in one way and the other. Thus, for example, use could be made of an endless screw or of any other mechanical means of the same type.

Furthermore, the actuation means comprises stroke-end sensors connected to a device 27 for actuating and controlling the cylinder, which device is itself connected to a source of pressurized air 29 connected to both ends of the cylinder 24 to actuate the same in one way and the other in a permanent manner in use. It may be understood that the device 27 for actuating and controlling the cylinder could be constructed in such a manner as to allow adjustment of the speed of displacement of the scraper along the corresponding wall, by a mere adjustment of the admission of air into the cylinder, as a function of the users' need.

If the container is short in length (about 12 feet) one may use a cylinder long enough to move the scraper 17 along the full length thereof. In such a case, only one scraper 17 is necessary for each inner wall 7 or 9.

However, if the container is much longer (about 30 feet or more), use could be made of several scraping units aligned onto the same inner wall, each unit comprising a scraper driven by a cylinder.

Figure 3:
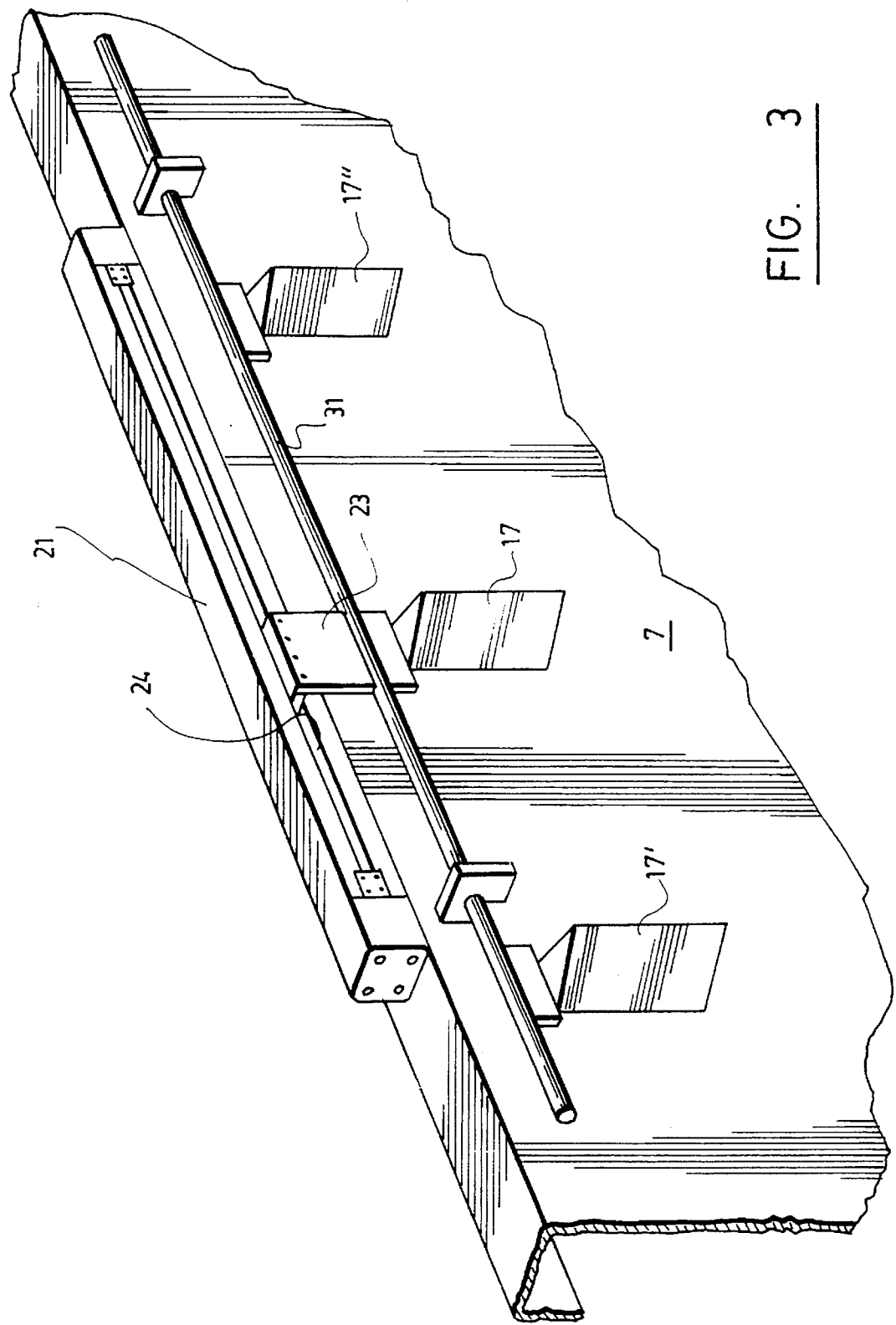
FIG. 3 is a view similar to the one of FIG. 2, showing a variant of the invention.

Alternatively, as is shown in FIG. 3, use could be made of a single cylinder 24 driving a support 23 on which a rod 31 is connected, this rod supporting two or three scrapers 17, 17' and 17". By properly selecting the length of the rod 31, it becomes possible to scrape the full length of the corresponding inner wall whatever be the length of the same.

Figure 5:
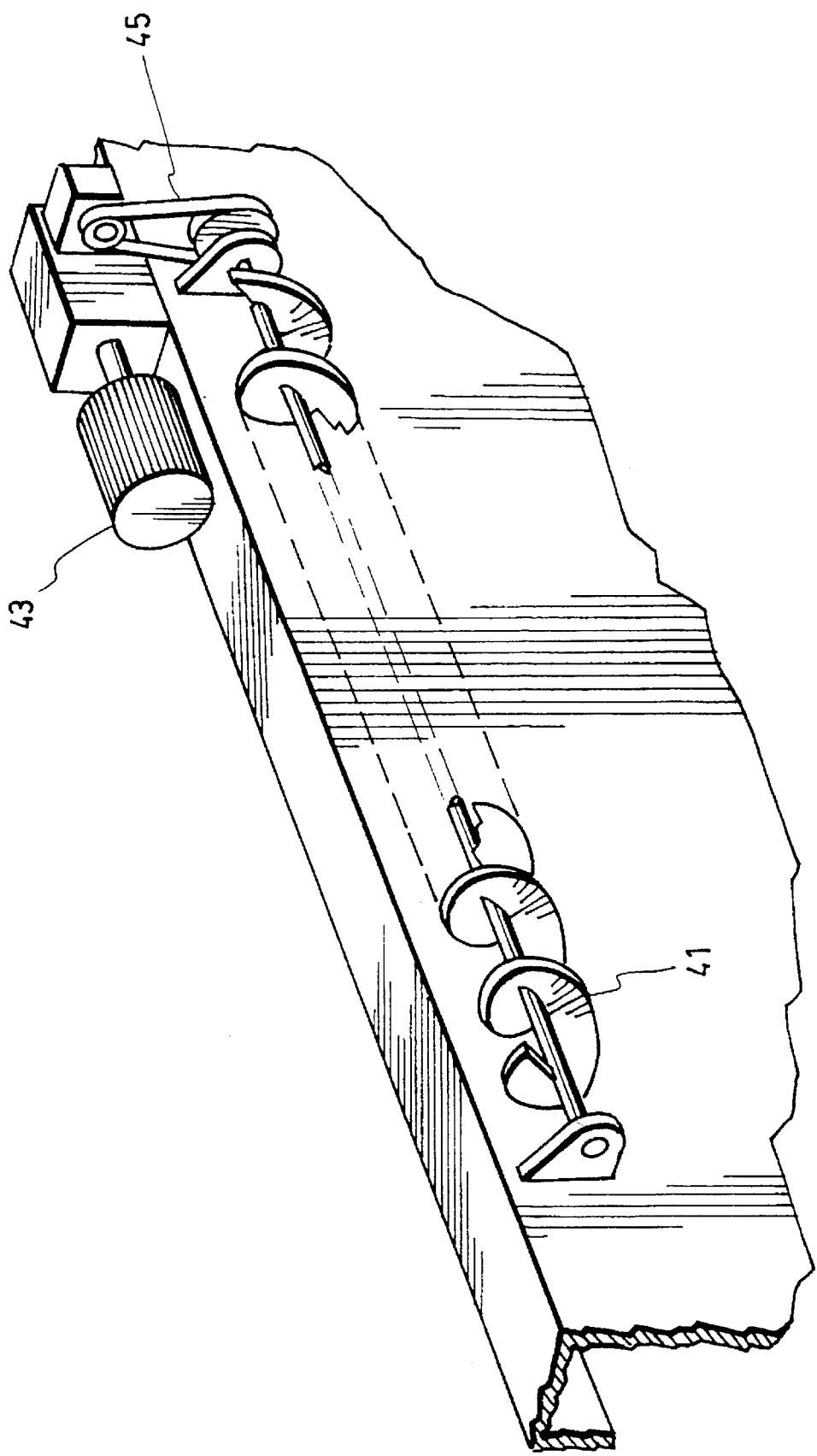
FIG. 5 is a view similar to the one of FIGS. 1 and 2, showing scraping means as can be used in another embodiment of the invention.

As is shown in FIG. 5, the scraping means may, alternatively, comprise, for each inner wall of the container, an endless screw 41 extending parallel to the inner wall along the same and at such a height as to be close to the top surface of the wastewater contained in the container. Actuating means such as a small motor 43 is used to drive into rotation the endless screw 41 via a gear box and chain 43. In both cases, the invention permits to take maximum advantage of the wastewater flow to drain the sludge towards the chute, provided that use is made with a wall scraping system which is very simple as compared to the existing systems.

Of course, numerous other modifications could be made to the present invention without departing from the scope of the same, as defined in the appended claims.

We claim:

1. A floatation cell for treating wastewater in order to remove solids in suspension within said wastewater in the form of a floating sludge, said cell comprising:

a container in which the wastewater is treated, the wastewater in said container having a top surface, said container being generally rectangular in shape and having two opposite ends and two inner walls that extend parallel between said opposite ends, a feed compartment in which the wastewater is fed, said compartment being located at one of said opposite ends of the container;

a chute located at said other opposite end of the container for collecting and evacuating the floating sludge formed within said container; and pushing means comprising at least one blade mounted onto a rotary shaft extending transversally on top of the container close to the chute in order to push the sludge into said chute, wherein:

the feed compartment has an outlet defined by a baffle, said baffle comprising means that extends at such a height with respect to the top surface of the wastewater contained within the container, as to generate a draining flow which directs the floating sludge towards the chute; and scraping means are provided for scraping at regular interval the inner walls of the container to avoid that the sludge accumulates on said walls and holds up the flow towards the chute, and wherein said scraping means include, for each inner wall:

at least one scraper comprising a blade located within the container close to the inner wall and to the top surface of the wastewater contained in said container; and actuation means for moving said at least one scraper in an alternative back and forth movement along said inner wall.

2. The floatation cell of claim 1, wherein each of said actuation means includes:

a guiding rail extending along at least one part of the corresponding inner wall, on which said at least one scraper is mounted;

at least one cylinder for moving back and forth said at least one scraper along said rail; and a set of stroke-end sensors connected to a device for actuating and controlling the cylinder in order to operate the same in one direction and in the other in a permanent manner in use.

3. The floatation cell of claim 2, wherein said device for operating and controlling the cylinder is adjustable to vary the speed of displacement of said at least one scraper along the corresponding inner wall.

4. The floatation cell of claim 3, wherein each cylinder is a pneumatic.

5. The floatation cell of claim 1, wherein said scraping means includes at least two scrapers per each inner wall, said at least two scrapers being spaced apart along the corresponding inner wall and being connected by mechanical means so as to be moved in unison by said actuation means.

6. The floatation cell of claim 6, wherein said scraping means includes at least two scrapers per each inner wall, said at least two scrapers being spaced apart along the corresponding inner wall and being connected by mechanical means so as to be moved in unison by said actuation means.

7. The floatation cell of claim 1, wherein the battle defining the outlet of the feed compartment is adjustable in height.

8. The floatation cell of claim 4, wherein the baffle defining the outlet of the feed compartment in adjustable in height.

9. The floatation cell of claim 5, wherein the baffle defining the outlet of the feed compartment is adjustable in height.

10. A floatation cell for treating wastewater in order to remove solids in suspension within said wastewater in the form of a floating sludge, said cell comprising:

a container in which the wastewater is treated, the wastewater in said container having a top surface, said container being generally rectangular in shape and having two opposite ends and two inner walls that extend parallel between said opposite ends, a feed compartment in which the wastewater is fed, said compartment being located at one of said opposite ends of the container;

a chute located at said other opposite end of the container for collecting and evacuating the floating sludge formed within said container; and pushing means comprising at least one blade mounted onto a rotary shaft extending transversally on top of the container close to the chute in order to push the sludge into said chute, wherein:

the feed compartment has an outlet defined by a baffle, said baffle comprising means that extends at such a height with respect to the top surface of the wastewater contained within the container, as to generate a draining flow which directs the floating sludge towards the chute; and scraping means are provided for scraping at regular interval the inner walls of the container to avoid that the sludge accumulates on said walls and holds up the flow towards the chute, and wherein said scraping means include, for each inner wall:

an endless screw extending within the container along the inner wall thereof close to said inner wall and to the top surface of the wastewater contained within said container; and actuation means for driving into rotation said endless screw.

11. The floatation cell of claim 10, wherein the baffle defining the outlet of the feed department is adjustable in height.

* * * * *